US010065552B2

(12) United States Patent
Plumski et al.

(10) Patent No.: US 10,065,552 B2
(45) Date of Patent: Sep. 4, 2018

(54) AUTOMATIC PRODUCT PUMP DRIVE AND CONTROLLED AREA NETWORK SYSTEM FOR VEHICLES

(71) Applicant: Polar Tank Trailer, LLC, Holdingford, MN (US)

(72) Inventors: Duane G. Plumski, St. Joseph, MN (US); Calvin E. Yardley, Carlyle, IL (US); Tracy L. Timmerman, Salem, IL (US); Philip J. Dybinig, Lanesboro, MN (US); Stephen P. Laumer, Oak Grove, MN (US); Robert P. Bergsgaard, Bloomington, MN (US); Andrew J. Long, Hamburg, MN (US)

(73) Assignee: Polor Tank Trailer, LLC, Holdingford, MN (US)

( * ) Notice: Subject to any disclaimer, the term of this patent is extended or adjusted under 35 U.S.C. 154(b) by 185 days.

(21) Appl. No.: 15/344,749

(22) Filed: Nov. 7, 2016

(65) Prior Publication Data
US 2017/0190276 A1 Jul. 6, 2017

Related U.S. Application Data

(60) Provisional application No. 62/251,950, filed on Nov. 6, 2015.

(51) Int. Cl.
*B60P 3/22* (2006.01)
*F02D 41/02* (2006.01)
*B67D 7/04* (2010.01)
*B67D 7/16* (2010.01)
*B67D 7/22* (2010.01)
*B67D 7/40* (2010.01)
*B67D 7/32* (2010.01)

(52) U.S. Cl.
CPC .............. *B60P 3/225* (2013.01); *B60P 3/228* (2013.01); *B67D 7/04* (2013.01); *B67D 7/16* (2013.01); *B67D 7/22* (2013.01); *B67D 7/40* (2013.01); *F02D 41/0215* (2013.01); *B67D 2007/329* (2013.01)

(58) Field of Classification Search
CPC . B60P 3/225; B60P 3/228; B67D 7/40; B67D 7/22; B67D 7/04; B67D 7/16; B67D 2007/329; F02D 41/0215
USPC .......................................................... 701/36
See application file for complete search history.

*Primary Examiner* — Brian P Sweeney
(74) *Attorney, Agent, or Firm* — Jeffrey R. Stone; Barnes & Thornburg LLPPolar Ta

(57) ABSTRACT

The present system is directed in one embodiment to a vehicle with a cargo tank or reservoir and a pumping system, comprising a centralized controlled area network (CAN) in operative communication with a programmed computing device, e.g., a programmed logic controller (PLC) that may automate the pumping process output to automatically adjust based on demand and may further enable a pump flow rate that is infinitely adjustable to match output requirements. In other embodiments, the pump speed is no longer dependent upon engine speed or RPM. In other embodiments, the CAN may monitor for vapor at the pump inlet and automatically slow the pump speed until the vapor problem is resolved. Other embodiments may comprise the CAN integrating various vehicle and pumping systems to maximize safety and safety issue annunciations.

21 Claims, 1 Drawing Sheet

AUTOMATIC PRODUCT PUMP DRIVE AND CONTROLLED AREA NETWORK SYSTEM FOR VEHICLES

CROSS-REFERENCE TO RELATED APPLICATIONS

This application claims priority to provisional application 62/251,950, filed on Nov. 6, 2015 and entitled AUTOMATIC HYDRAULIC PUMP DRIVE AND CONTROL SYSTEM, the entire contents of which is hereby incorporated by reference.

FEDERAL FUNDING

None

BACKGROUND OF THE INVENTION

Field of the Invention

The present invention is directed to a Controlled Area Network (CAN) installed on a vehicle having an improved pumping system for pumping product. More specifically, embodiments of the present invention comprise centralized CAN-based control of various vehicle elements, including improved safety mechanisms. Embodiments of the present invention comprise an improvement in pump efficiency and control.

Description of the Related Art

Generally, the various embodiments of the present invention are applicable to a vehicle having the following core components: a truck chassis; a pressure vessel for storing product therein, e.g., in the case of a typical bobtail propane truck, well known to the skilled artisan, this may comprise a propane cargo tank, a product pump; a drive system for the product pump; piping from the product pump to a metering mechanism; piping from the metering mechanism to a hose reel; manual shutoff valve(s); a remote pump and valve shutoff system for controlling an emergency discharge; safety mechanisms, e.g., chock blocks for the wheels, proximity sensors for the piping outlets, emergency shut off switches and the like; a liquid level gauge; pressure gauges; a temperature gauge; and lighting.

The known vehicles comprising at least some of these listed components generally comprises a system of pressure switches, relays, wire harnesses, air lines, and drive lines, entirely lacking in integration of the various components in a centralized controller mechanism. Each known individual component or system, therefore, performs its function, but without communication capability to any of the other systems. Various problems result, not the least of which is the lack of integrational information related to the various safety mechanisms on the vehicles. As a result, these individual and unconnected systems operate independently and must therefore be individually and manually monitored.

In addition, known vehicles comprising a product pump system require the pump to operate only at a maximum speed, or at a finite set of individual and discrete speed points. As a general practice, known product pumping systems are not designed to intentionally vary the speed of the product pump because the pumps are sized and applied within a system for which the primary goal is maximization of pump efficiency. Instead, these known systems require selection of a pump speed which is then maintained during the operation.

In these cases, upon output requirements of the pumping system, a bypass loop is provided whereby product is diverted back to the reservoir or cargo tank. The diversion of product back to a reservoir or cargo tank is inefficient as it requires extra work to be done by the pump.

Moreover, known vehicles as discussed above require direct drive systems that demand that the vehicle engine idle at the slowest possible speed to ensure there is no detrimental effects to the product pump since the engine in these known systems is directly coupled to the product pump through the use of a "hot shift" power take-off (PTO), either "on" or "off". This slow engine idle results in soot buildup in the vehicle engine that is detrimental to the engine and emission system, leading to premature failure.

Hydraulic systems are available for breaking the connection between the engine and the product pump, but these systems do not operate automatically based on the output of the components that the, hydraulic system drives. Instead, these known hydraulic systems are simply based on the allowance of different manually set individual and discrete points.

Further, known systems will comprise product pumps that will cavitate from time to time as a result of vapor in the pump. In order to ensure the cavitation state is not run for too long a period of time, known systems require that the product pump simply be shut down manually. Further, the notice of cavitation in known systems is provided by a pressure or flow meter that visually displays an abrupt reduction in output flow. Additionally, cavitation may be audibly noticeable to the operator. In all known cases, annunciation of cavitation requires an operator to manually shut the pump down. One other option for known systems running under a state of cavitation is to simply allow the product pump to continue cavitating; leading to damage to the product pump and shorter pump lifespan, as well as very inefficient and slowed delivery of product as the output flow is reduced as a result of the pump pumping vapor bubbles along with liquid or other content. All of the known systems require an operator to actively monitor for cavitation and, when noticed, the operator must take one of the above-mentioned steps in response. None of the known systems allow for automated monitoring of the cavitation problem as well as an automated adjustment of the pump speed in response until the cavitation-causing vapor problem has been resolved.

Finally, known pump systems require a manual adjustment of the output flow rate and, therefore, do not and cannot automatically adjust based on demand.

The present invention provides solutions for, inter alia, these problems.

SUMMARY OF THE INVENTION

The present system is directed in one embodiment to a vehicle with a cargo tank or reservoir and a pumping system, comprising a centralized controlled area network (CAN) that may assist in automating the pumping process output to automatically adjust based on demand and may further enable automation of a pump flow rate that is infinitely adjustable to match output requirements. In other embodiments, the pump speed is no longer dependent upon engine speed or RPM. In other embodiments, the CAN may facilitate vapor monitoring at the pump inlet and automatically slow the pump speed until the vapor problem is resolved. Other embodiments may comprise the CAN integrating various vehicle and pumping systems to maximize safety and safety issue annunciations.

The figures and the detailed description which follow more particularly exemplify these and other embodiments of the invention.

DETAILED DESCRIPTION OF THE INVENTION

Figure 1:
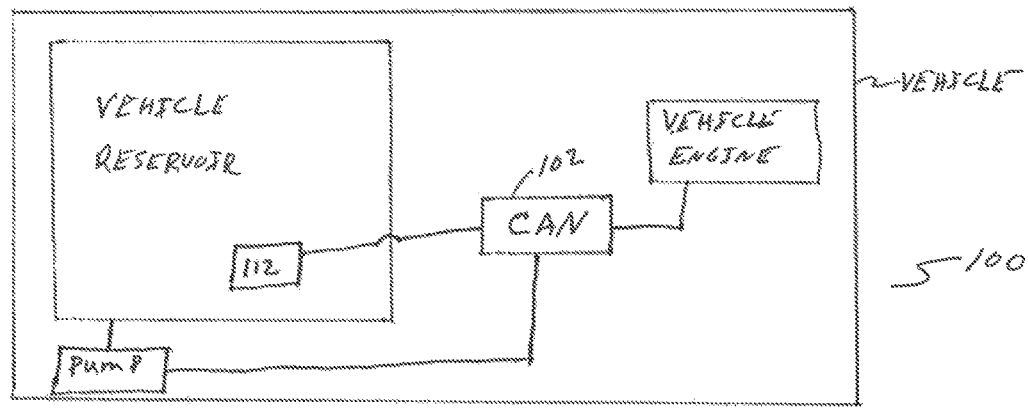
FIG. 1 is a schematic view of one embodiment of the present invention.

While the invention is amenable to various modifications and alternative forms, specifics thereof are shown by way of example in the drawings and described in detail herein. It should be understood, however, that the intention is not to limit the invention to the particular embodiments described. On the contrary, the intention is to cover all modifications, equivalents, and alternatives falling within the spirit and scope of the invention. Vehicles having a product pumping system are assisted by various embodiments of the present invention. These vehicles include but are not limited to: tank trailers; chassis-mounted tanks; propane bobtails; refined fuel trucks; sanitary trailers; crude oil trailers and trucks; vacuum trailers and trucks; compressor systems in dry bulk applications; chemical pumping systems; cryogenic pumping systems.

In addition, stationary pumping systems may benefit from the various embodiments of the inventions described herein. For example, stationary pumping systems that may benefit from the present invention, may be used for pumping, without limitation, refined fuels, propane, sanitary materials, crude oil, dry bulk applications, chemicals and cryogenics.

Integration of systems in a control system 100 with a programmed computing device 104 within a controlled area network (CAN) 102 is provided in certain embodiments of the present invention. The programmed computing device 104 may comprise, in a preferred embodiment at least one programmed logic controller (PLC), or in other embodiments at least one computing device 104 such as a computer, laptop computer, tablet computer or a smartphone, and including a memory, or equivalent, for storing programmed instructions and well as operating parameters, discussed further below, a processor in operative communication with the memory for executing the stored programmed instructions, and an input device, e.g., a keyboard or the equivalent, in operative communication with the memory and the processor, not shown in the figures but as is well known in the art. In addition, a display is provided in operative communication with the at least one PLC or computing device 104 for displaying operating conditions and various system messages.

The PLC(s), or other computing device(s) 104, is/are in operative communication with the CAN 102, including the various elements of the CAN 102 discussed herein.

Note that "operative communication" of the computing device, e.g., PLC, 104 with the CAN 102 and of the CAN elements with each other and with the PLC as that term is used herein is intended to be construed broadly to mean any form of connection, wired or wireless, that will allow for electrical and/or data communication to occur between the relevant elements of the system.

Figure 2:
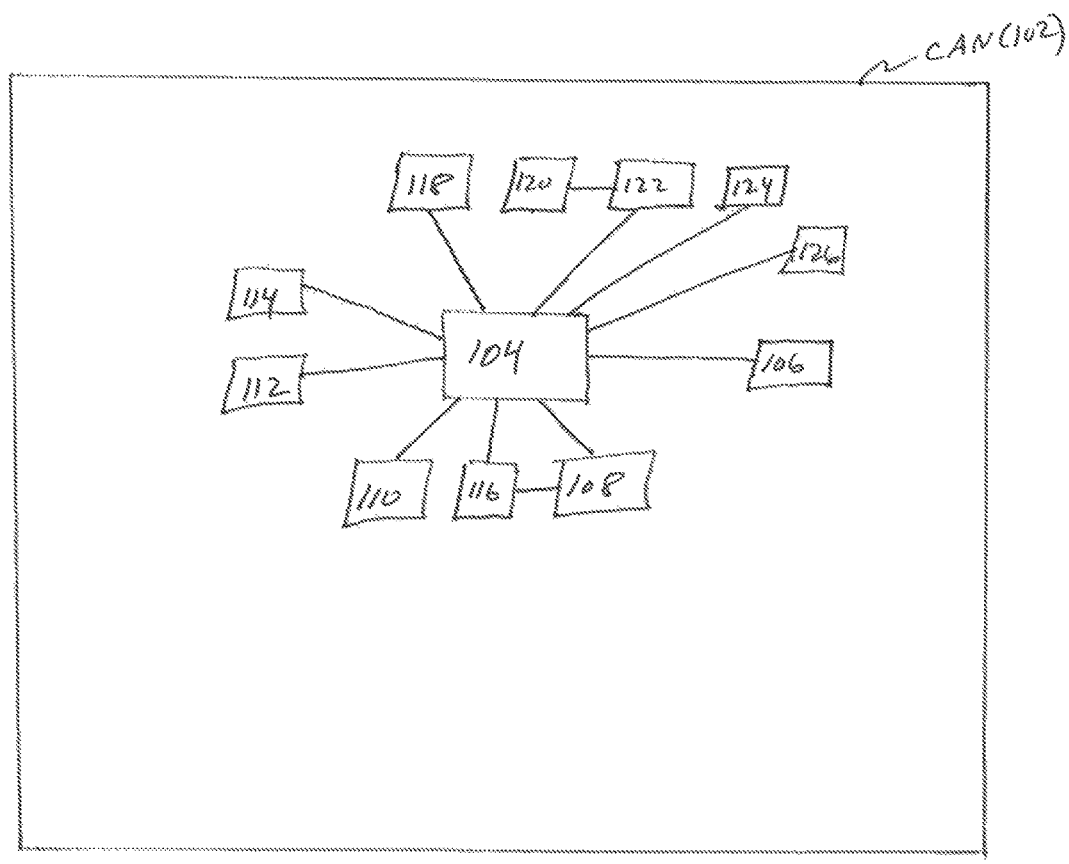
FIG. 2 is a schematic view of one embodiment of a controlled area network (CAN) of the present invention.

The CAN elements may comprise in various embodiments, as illustrated in FIG. 2:

at least one PLC, or other programmed computing device 104;
the vehicle engine 106;
the flow meter(s) 108;
the product pump 110;
pressure sensor(s) in the reservoir or tank 112;
pressure sensor(s) at the reservoir/tank outlet or at the outlet of the product pump 114;
product flow sensor(s) proximate the pump 116;
vapor sensor(s) proximate or within the pump 118; and
the hose reel 120 and hose reel sensor(s) 122 to determine position status of the hose reel; and
safety indicator elements, including proximity sensors or switches 124 indicating wheel chocks are in their holders, proximity sensors or switches 126 indicating whether the dispensing nozzle is in its holster or holder; hose coupling caps are in place, vehicle transmission position and annunciation of same.

The product pump display page displays adjustable flow parameters and differential PSI information and may comprise a "high flow" setting in gallons per minute; a "low flow" setting in gallons per minute; a cavitation status warning display; and a differential PSI display.

The hose reel page displays the status of hose reel positional status and may comprise a hose position status display.

The meter page displays flow rate and the amount of liquid pumped and may comprise a flow rate display in gallons per minute; gallons pumped; gallons remaining; and meter mode display.

The safety systems page may display a side view of the vehicle with annunciators for indicating what is preventing the particular operation from proceeding.

In addition to monitoring, displaying and automatically changing certain operational parameters depending on the monitored parameter results, discussed in more detail below, the programmed computing device, e.g., PLC, 104 controls, via the CAN 102 operative connections, the sequence of events required for initiating, and continuing, product delivery from the vehicle reservoir or stationary reservoir. In addition, the computing device, e.g., the PLC, 104 also via the CAN operative connections, controls the sequence of events required for initiating, and continuing, product loading into a vehicle reservoir or stationary reservoir.

The integrated pump system, in operative communication with, and controlled by the programmed computing device 104 of CAN 102, allows for an infinite number of automated responsive settings to match output requirements, depending on the magnitude of certain operational parameters monitored by sensors in operational communication with the CAN 102.

A nominal pump speed may be entered into the programmed computing device, e.g., a PLC, 104 and controlled as discussed further herein. One preferred nominal pump speed for a propane pump 110 in fluid connection with a propane reservoir or tank may be set at 650 RPM, though an infinite number of pump speed choices are available.

The pump 110 may be operatively connected to a fixed displacement hydraulic motor, though other types of motors may be used to accomplish the various embodiments described herein and not shown as it is well known in the art. The pump 110 is preferably a load sense pump and will output the required flow based on the pressure drop measured by pressure sensors mounted both at the outlet of the pump, or the outlet of the reservoir/tank, 114 and within the reservoir/tank 112, each pressure sensor 112, 114 being in operative communication with the CAN 102 and programmed computing device, e.g., a PLC 104. The PLC 104 is programmed to compare the pressure drop from the measured pressure of the reservoir/tank to the measured pressure at the pump or reservoir/tank outlet, resulting in a measured pressure differential, these measured pressures obtained from the pressure sensors 112, 114. The required outflow of fluid is achieved through use of a proportional flow control.

Generally, based on the measured pressure differential in the reservoir/tank and the outlet of the pump or reservoir/rank, the pump speed may be automatically increased, or decreased, by the instructions programed into the programmed computing device, e.g., PLC, 104 of the CAN 102 to maintain an established pressure differential during a "high flow" or "low flow" operation as defined and controlled by the PLC 104 as enabled by the CAN 102.

An exemplary established pressure differential may be set to 125 PSI in the CAN's programmed computing device, e.g., PLC 104 though the skilled artisan will readily recognize that other preferred established pressure differential levels may be used, each of which is within the scope of the present invention. In the "high flow" operation, a product flow rate upper limit is entered into the programmed computing device, e.g., PLC programming, e.g., an exemplary preferred upper limit may be 100 gallons per minute. In the "high flow" operation, the pump speed may be automatically adjusted by the programmed computing device, e.g., PLC programming to adjust pump 110 flow so that the desired pressure differential is substantially maintained. If the product flow rate upper limit is exceeded, or exceeded for a pre-determined time period, then the programmed computing device, e.g., PLC programming may automatically adjust the pump speed downward.

A "low flow" operation is also defined and is based on the product flow output flow rate from the pump 112. In the "low flow" operation, the pump speed may be changed automatically by the programmed computing device, e.g., PLC 104 programming to adjust the pump flow so that the established pressure differential, e.g., 125 PSI, is maintained. In this "low flow" operation, a default flow rate is provided which may be, e.g., 40 gallons per minute, though other default flow rates are within the scope of the invention.

If, in any case, the pressure differential measured by the pressure sensors between the reservoir and the pump, or reservoir, outlet 112, 114 is calculated to drop below a lower limit, e.g., 40 PSI, for a predetermined amount of time, e.g., 20 or more seconds, the pump 112 will automatically slow according to programmed computing device, e.g., PLC 104 programming to a fixed speed to prevent pumping vapor rather than liquid to prevent cavitation. This fixed speed may be set at 300 RPM, though other speeds will also work and are within the scope of the invention.

In addition, if the pressure differential measured by the pressure sensors between the reservoir/tank and the pump outlet, 112, 114 is calculated to rise above an upper limit entered into the programmed computing device, e.g., PLC 104 programming, the programmed instructions in the exemplary PLC 104 comprise the ability to shut the pump 112 down. In certain embodiments, the exemplary PLC instructions may enable the automatic restarting of the pump 112 when the pressure differential drops below the upper limit while in other embodiments the pump restart must be done manually.

In addition to the above-described monitoring and responsive actions taken to prevent cavitation, vapor monitoring with vapor sensors may be employed to detect onset of cavitation and slowing pump speed. For example, the pump 112 will automatically slow according to the programming of the exemplary PLC 104 to a fixed speed to prevent pumping vapor rather than liquid to prevent cavitation. This fixed speed may be set at 300 RPM, though other speeds will also work and are within the scope of the invention.

In addition to the above, in certain embodiments, pump speed is made independent of engine speed/RPM and is controlled by the programming of the exemplary PLC 104 of the CAN 102.

As briefly discussed above, the sequence of events required for initiating and continuing product delivery from the vehicle reservoir or stationary reservoir is controlled by the PLC instructions, as enabled by the CAN connections. In addition, the PLC 104, also via the CAN 102 operative connections, controls the sequence of events required for initiating, and continuing, product loading into a vehicle reservoir or stationary reservoir.

Thus, product pump 112 function, e.g., hydraulic function, will not be enabled if (1) the vehicle is not detected as being in neutral, (2) the wheel chocks are in their holder, and (3) the parking brake is not set. Further, the vehicle transmission will be locked from moving from neutral, with transmission inhibit message sent from the PLC to the display if the product pump is functioning.

When the pumping operation is complete, the following conditions must be sensed and present for the vehicle to move: (1) the wheel chocks must be sensed by proximity sensors or switches 124 and detected as back in their carrier; (2) the dispensing nozzle must be sensed as present by proximity sensors or switches 126 within the dispensing nozzle holster on the truck, else a transmission inhibit message is sent from the PLC to the display and the transmission will not be allowed to move out of neutral; (3) caps must be sensed as coupled on the hoses to indicate that the hoses are no longer connected or else a transmission inhibit message is sent and the transmission is not allowed to move out of neutral.

In addition, an emergency shutoff is present that, when activated by pushing an actuating button, will: (1) cause the vehicle engine to shut off; (2) all hydraulic/pump flow stops; (3) all internal valves, e.g., internal propane valves in the case of a propane reservoir and pump 112; and (4) all air valves are opened to vent; and the vehicle will require a specific ignition sequence to reset the system. The emergency shutoff actuating button will not function as above if the parking brake is not set.

A remote control may be provided and that may go out of range at times. When this out of range situation is detected, the system shuts down in the same way as it does when the emergency shutoff is activated as described above.

The following specific exemplary embodiment of specific sequence control for filling a vehicle's reservoir or tank is provided:
 1. Transmission set to neutral and parking brake set;
 2. Chocks must be sensed as removed from their holders;
 3. Transmission inhibition message is sent;
 4. Fill cap is opened;
 5. Liquid valve is closed;
 6. Vapor valve is opened; and
 7. Meter hose end is stowed.

The following specific exemplary embodiment of specific sequence control for dispensing liquid from the reservoir or tank of a vehicle or a stationary reservoir or tank is provided:
 1. Transmission set to neutral and parking brake set;
 2. Chocks must be sensed as out of the holders;
 3. Transmission inhibited message sent;
 4. Hose is detected as out of holster;

5. Liquid internal valve is opened;
6. Fill cap is opened (optional);
7. Vapor valve is opened (optional);
8. Auxiliary cap is opened (optional); and
9. Pump is turned on The descriptions of the embodiments and their applications as set forth herein should be construed as illustrative, and are not intended to limit the scope of the disclosure. Features of various embodiments may be combined with other embodiments and/or features thereof within the metes and bounds of the disclosure. Upon study of this disclosure, variations and modifications of the embodiments disclosed herein are possible and practical alternatives to and equivalents of the various elements of the embodiments will be understood by and become apparent to those of ordinary skill in the art. Such variations and modifications of the embodiments disclosed herein may be made without departing from the scope and spirit of the invention. Therefore, all alternatives, variations, modifications, etc., as may become to one of ordinary skill in the art are considered as being within the metes and bounds of the instant disclosure.

We claim:

1. A control system for a vehicle having and engine and a product reservoir and a pump and pump system including a pump motor for pumping the product, comprising:
   a controlled area network (CAN) comprising, and in operative communication with, the following vehicle components:
   at least one programmed computing device, including operational instructions and settings for operational parameters stored in the programmed computing device, a data input device and a display in operative communication therewith;
   the vehicle engine in operative communication with the at least one programmed computing device;
   the product pump and pump system in operative communication with the at least one programmed computing device;
   at least one product flow meter in operative communication with the product pump and in operative communication with the at least one programmed computing device;
   at least one pressure sensor in the product reservoir and in operative communication with the at least one programmed computing device;
   at least one pressure sensor at the outlet of the product pump and in operative communication with the at least one programmed computing device;
   at least one product flow sensor within the pumping system and in operative communication with the at least one programmed computing device; and
   at least one hose reel and hose reel position status sensor and in operative communication with the at least one programmed computing device; and
   safety indicator elements in operative communication with the at least one programmed computing device and comprising proximity sensors or switches indicating that a vehicle wheel chock is positioned in a wheel chock holder, that a product dispensing nozzle in operative communication with the product pump is positioned in a product dispensing nozzle holder, and monitoring of vehicle transmission position, with annunciation of all safety indicator elements on the display.

2. The control system of claim 1, wherein the programmed computing device comprises a programmed logic controller (PLC).

3. The control system of claim 2, further comprising at least one vapor sensor adapted to detect vapor within or proximate the product pump.

4. The control system of claim 3, wherein if vapor is detected by the at least one vapor sensor, the pump slows to a speed at which cavitation is at least substantially eliminated according to the programmed computing device instructions.

5. The control system of claim 1, wherein the instructions stored in the programmed computing device calculate a pressure differential based on pressure results measured within the reservoir and at the product pump outlet.

6. The control system of claim 5, wherein the programmed computing device is programmed to maintain the pressure differential at a predetermined level.

7. The control system of claim 6, wherein the programmed computing device automatically adjusts the product pump speed to maintain the predetermined pressure differential level.

8. The control system of claim 7, wherein the speed of the product pump is infinitely adjustable by the programmed computing device to maintain the predetermined pressure differential level.

9. The control system of claim 8, further comprising a set lower limit for the pressure differential in the programmed computing device instructions and wherein when the pressure differential is measured below the set lower limit, the pump slows to a speed at which cavitation is at least substantially eliminated according to the programmed computing device instructions.

10. The control system of claim 9, further comprising a set upper limit for the pressure differential in the programmed computing device instructions and wherein when the pressure differential is measured above the set upper limit, the pump is shut down according to the programmed computing device instructions.

11. The control system of claim 10, further comprising a set upper flow rate limit in the programmed computing device instructions and wherein when the flow rate is measured above the set upper flow rate limit, the pump speed is slowed according to the programmed computing device instructions.

12. The control system of claim 11, further comprising a set upper flow rate limit in the programmed computing device instructions and wherein when the flow rate is measured above the set upper flow rate limit, the pump speed is increased according to the programmed computing device instructions.

13. The control system of claim 12, wherein the pumping system does not comprise a dedicated mechanical bypass.

14. The control system of claim 12, wherein the control system is applied to the pumping of product into the vehicle reservoir and to the pumping of product out of the vehicle reservoir.

15. The control system of claim 12, wherein the pump is rendered inoperable according to the programmed computing device instructions if at least one of the following conditions is detected by the CAN: a wheel chock is detected as being in the wheel chock holder; the vehicle transmission is detected as not in neutral, and a parking brake on the vehicle is detected as not engaged.

16. The control system of claim 15, wherein the vehicle is rendered inoperable for driving movement according to the programmed computing device instructions if at least one of the following conditions is detected by the CAN: a wheel chock is detected as not in its holder, and the product dispensing nozzle is not detected as being within its product dispensing nozzle holder.

17. The control system of claim 16, further comprising a remote control comprising a display, the remote control arranged to receive and display pumping process data and/or status in real time during the pumping of product.

18. The control system of claim 17, wherein the remote control receives and displays the amount of product that has been pumped.

19. The control system of claim 18, wherein the remote control is adapted to enable operator control of the control system and/or pumping.

20. A method for automatically shutting off a pump based on a sensed vapor condition, comprising:
providing a product reservoir with an amount of fluid stored therein;
providing a pump in controlled fluid communication with the fluid within the product reservoir;
providing a vapor detection sensor in operational communication with the pump;
providing a programmed computing device in operational communication with the pump and the vapor detection sensor, the programmed computing device programmed to shut down the pump when vapor is sensed for a predetermined period of time;
operating the pump to pump fluid from the product reservoir to a second reservoir;
sensing vapor with the vapor detection sensor for the predetermined period of time and communicating to the programmed computing device that vapor was sensed for the predetermined amount of time;
sending a pump shut off signal from the programmed computing device to the pump.

21. The method of claim 20, further comprising:
a vehicle having an engine and a power take-off connected operatively to the engine,
wherein the vehicle's power take-off is in operational communication with the programmed computing device, and
wherein the programmed computing device sends the pump shutoff signal to the power take-off to stop the pump.

* * * * *